(12) United States Patent
Prima

(10) Patent No.: US 12,319,225 B2
(45) Date of Patent: Jun. 3, 2025

(54) GAS GENERATOR WITH A PRESSURIZED GAS RESERVE

(71) Applicant: Autoliv Development AB, Vargarda (SE)

(72) Inventor: Gerald Prima, Pont de Buis (FR)

(73) Assignee: Autoliv Development AB, Vargarda (SE)

( * ) Notice: Subject to any disclaimer, the term of this patent is extended or adjusted under 35 U.S.C. 154(b) by 77 days.

(21) Appl. No.: 18/301,033

(22) Filed: Apr. 14, 2023

(65) Prior Publication Data

US 2023/0339424 A1 Oct. 26, 2023

(30) Foreign Application Priority Data

Apr. 20, 2022 (FR) ..................................... 2203638

(51) Int. Cl.
*B60R 21/274* (2011.01)
(52) U.S. Cl.
CPC ................................. *B60R 21/274* (2013.01)
(58) Field of Classification Search
CPC .. B60R 2021/26094; B60R 2021/2685; B60R 21/268; B60R 21/272; B60R 21/274
See application file for complete search history.

(56) References Cited

U.S. PATENT DOCUMENTS

| 11,338,761 | B2 | 5/2022 | Rea |
| 2015/0343987 | A1 | 12/2015 | Aderum et al. |
| 2021/0221325 | A1* | 7/2021 | Rea ...................... B60R 21/268 |
| 2023/0339423 | A1* | 10/2023 | Skog .................... B60R 21/261 |

FOREIGN PATENT DOCUMENTS

| FR | 2998845 A1 | 6/2014 |
| FR | 3028594 A1 | 5/2016 |
| FR | 3051167 B1 | 4/2018 |
| WO | 2010058251 A1 | 5/2010 |
| WO | 2016079048 A1 | 5/2016 |
| WO | 2019030693 A1 | 2/2019 |

* cited by examiner

*Primary Examiner* — Laura Freedman

(57) ABSTRACT

A gas generator includes a chamber with an outlet port; a breakable seal; pressurized gas stored in the chamber; and an insert nozzle positioned in the chamber having at least three intermediate orifices and positioned between the gas outlet and at least some of the pressurized gas. The insert nozzle is arranged to deform after the breakable seal is ruptured, during the application of a pressure difference between a downstream face and an upstream face of the insert nozzle exerted by the at least some of the pressurized gas.

17 Claims, 3 Drawing Sheets

[Fig. 1]
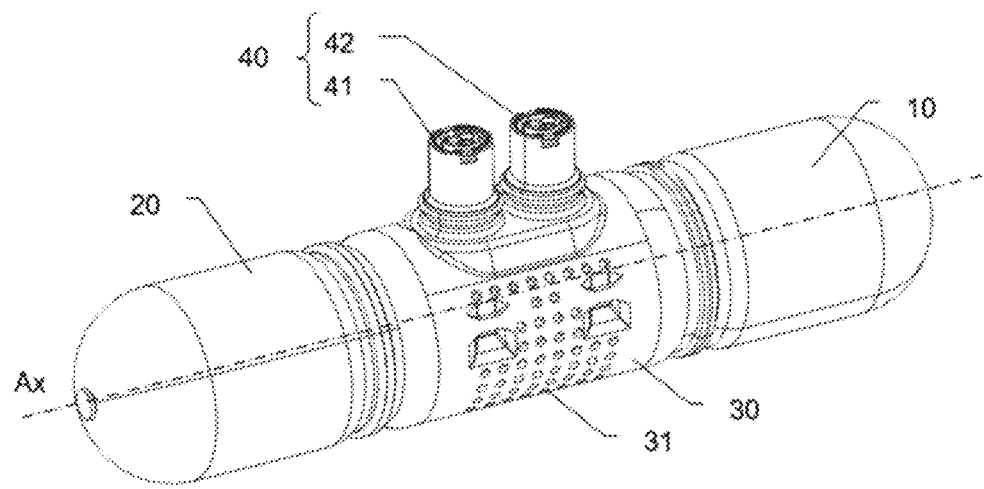
[Fig. 2]
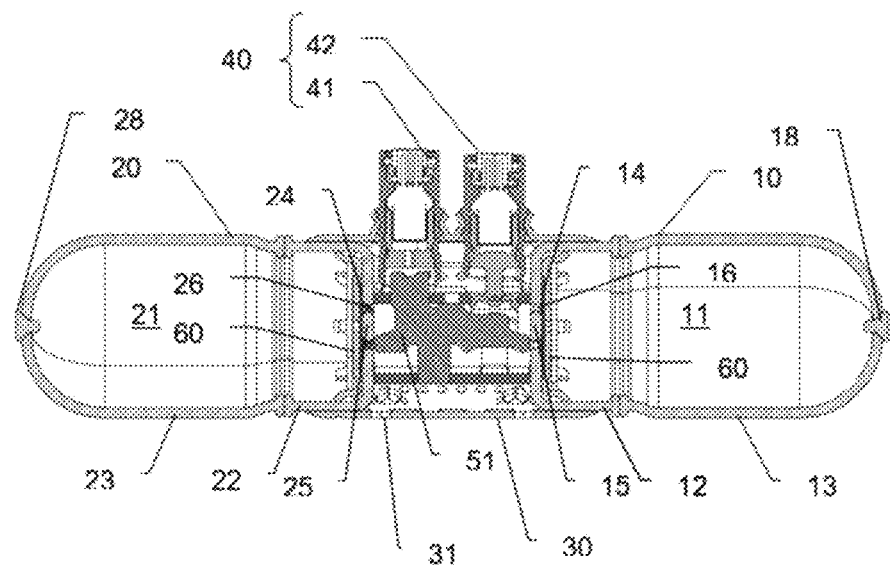

[Fig. 3]
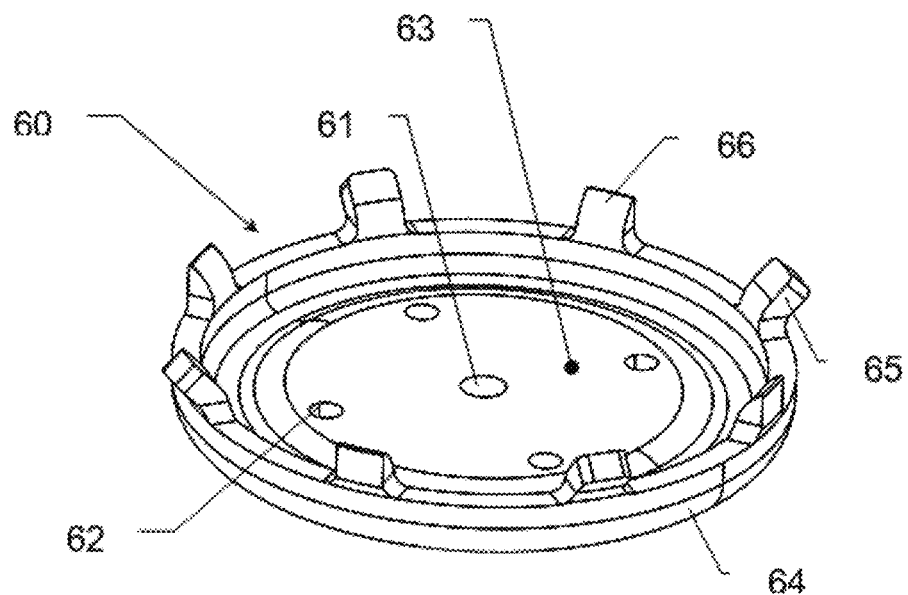
[Fig. 4]
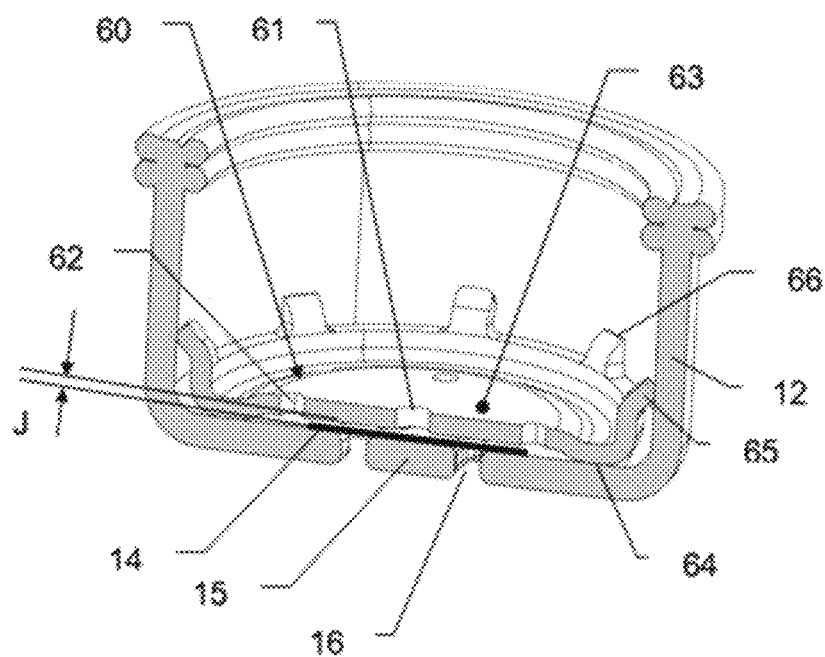

[Fig. 5]
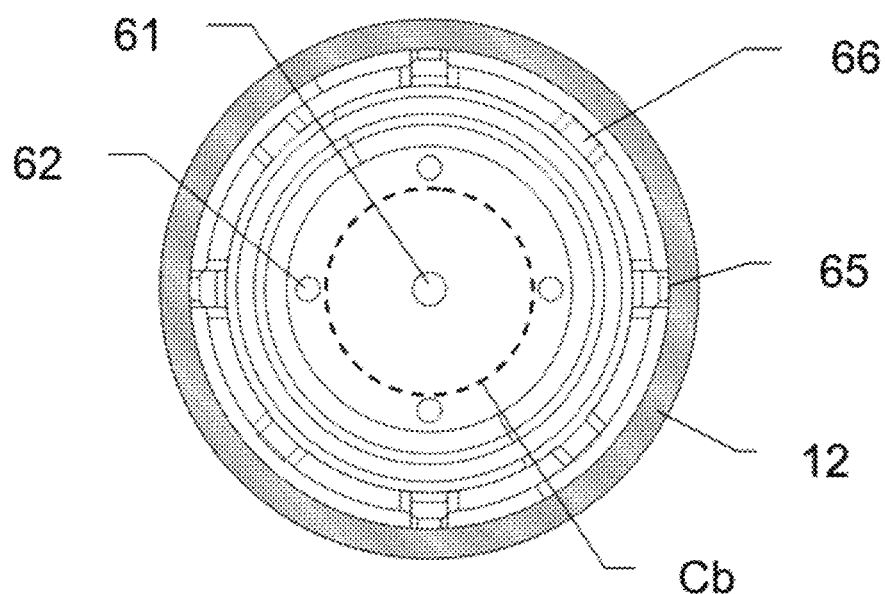
[Fig. 6]
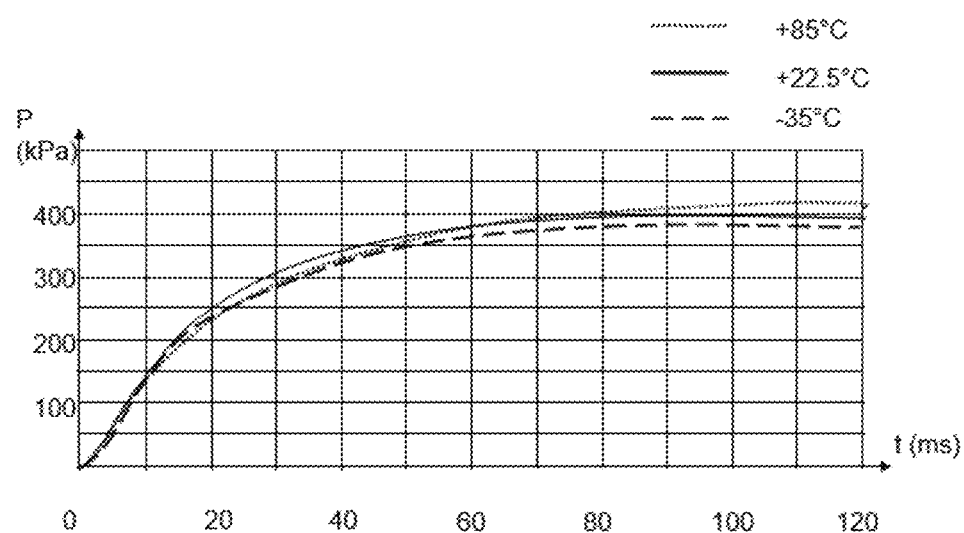

GAS GENERATOR WITH A PRESSURIZED GAS RESERVE

This application claims priority pursuant to 35 U.S.C. 119(a) to French Application No. 2203638, filed Apr. 20, 2022, which application is incorporated herein by reference in its entirety.

TECHNICAL FIELD OF THE INVENTION

The present invention generally relates to a gas generator for automotive safety applications. In particular, the present invention relates to a gas generator with a pressurized gas reserve.

STATE OF THE ART

Gas generators are known from the prior art with a pressurized gas reserve to propose flow rate regulation devices based on the pressure. Document WO2010058251A1 discloses a gas generator with a deformable membrane. In return, this system may present increased manufacturing complexity with, for example, the membrane to be welded and complex support parts.

DISCLOSURE OF THE INVENTION

One purpose of the present invention is to resolve the shortcomings of the prior art mentioned hereinbefore and in particular, firstly, to propose a gas generator with a chamber storing pressurized gas and a flow rate regulation device based on the pressure that is simple, inexpensive and not very complex to manufacture.

To this end, a first aspect of the invention therefore relates to a gas generator comprising:
 a chamber with an outlet port,
 breakable sealing means closing the outlet port,
 pressurized gas(es) stored in the chamber,
 an insert nozzle positioned in the chamber, comprising at least three intermediate orifices and positioned between the gas outlet and at least some of the pressurized gas(es),
characterized in that the insert nozzle is arranged so as to deform after the breakable sealing means are ruptured, during the application of a pressure difference between a downstream face and an upstream face of the insert nozzle exerted by said at least some of the pressurized gas(es), so as to restrict a passage of gas towards the gas outlet.

The gas generator according to the implementation hereinbefore comprises an insert nozzle with at least three intermediate orifices to control the flow of pressurized gas during its discharge. The insert nozzle may deform in order to restrict a passage of gas if a pressure differential (once the gas generator is activated) occurs. Only one part is required to provide the flow rate regulation function based on the prevailing pressure in the chamber (as the pressure is typically based on the temperature of the gas generator).

Depending on one embodiment, the insert nozzle may be arranged to plastically deform if the pressure difference between the downstream face and the upstream face of the insert nozzle exceeds a first predetermined threshold. In other words, the insert nozzle may be arranged so as to be irreversibly deformed if the pressure difference between the downstream face and the upstream face of the insert nozzle exceeds a first predetermined threshold. Given that a gas generator may be required to operate at temperatures between −35° C. and +85° C., provision may be made, for example, that the insert nozzle:
 does not irreversibly deform at temperatures between −35° C. and −10° C.,
 is plastically or irreversibly deformed at temperatures of between −10° C. and +85° C. Consequently, provision may be made to compensate for the differences in discharge rates (faster at high temperatures) by regulating the area of the gas passage towards the gas outlet (more restricted at high temperature due to the irreversible deformation of the insert nozzle). Such an implementation makes it possible to limit the performance differences, and in particular, this limits the rate of pressure increase between the operating temperatures.

According to one embodiment, the insert nozzle may be arranged to be plastically and elastically deformed if the pressure difference between the downstream face and the upstream face of the insert nozzle exceeds a first predetermined threshold reached from a predetermined operating temperature. Of course, the insert nozzle may be arranged so as to be elastically deformed if the pressure difference between the downstream face and the upstream face of the insert nozzle does not exceed the first predetermined threshold reached from a predetermined operating temperature.

The pressure difference between the downstream face and the upstream face of the insert nozzle may depend on a storage pressure in the chamber, and/or on an area of the outlet port, and/or on the composition of the pressurized gases and their sensitivity to variations in temperature. In other words, depending on the parameters hereinabove, provision may be made to adjust the characteristics of the insert nozzle in order to ensure changing from the reversible mode of operation to the irreversible mode of operation at a particular temperature, given all the other influencing parameters.

According to one embodiment, the gas generator may comprise a downstream support in contact with the downstream face of the insert nozzle. According to one embodiment, the downstream support may be inserted and/or chosen and/or adjusted in order to determine a threshold force causing a plastic deformation of the insert nozzle at a predetermined threshold of pressure difference between the downstream face and the upstream face of the insert nozzle. The downstream support may be easily changed between two gas generator references that should have a specific operation. Typically, the greater the downstream support diameter for the insert nozzle, the greater will be the plastic deformation at low operating temperatures.

According to one embodiment, the restricted gas passage may be arranged between at least one of the intermediate orifices and the outlet port.

According to one embodiment:
 the outlet port may be housed in or arranged on a chamber bottom wall,
 the insert nozzle may be arranged opposite the chamber bottom wall and may comprise a support portion and an offset portion, the support portion being supported on the chamber bottom wall, and the offset portion being separate from the chamber bottom wall and comprising at least one intermediate orifice and preferably all intermediate orifices. In other words, the insert nozzle may be cup- or bowl-shaped with a peripheral portion against the chamber bottom, and a central offset portion that may connect with the chamber bottom if the pressure exerted by the pressurized gas(es) is too high when the gas generator is operating. The part is simple to manufacture and easy to position in the chamber.

According to one embodiment, the support portion may surround the outlet port and may preferably have a flat supporting surface with the chamber bottom wall. In particular, provision may be made not to solder the insert nozzle onto the chamber nor onto another part of the gas generator.

According to one embodiment, at least one intermediate orifice may be arranged around the periphery of the offset portion. Thus, central deformation of the insert nozzle will necessarily limit a passage of gas between the intermediate orifice arranged around the periphery and the chamber bottom.

According to one embodiment, at least one intermediate orifice may be opposite a solid portion of the chamber bottom wall.

According to one embodiment, an intermediate orifice may be arranged opposite the outlet port, and preferably in which a single intermediate orifice may be arranged opposite the outlet port.

According to one embodiment:
a lateral surface of a flow-through cylinder having a height defined by a distance between the downstream face of the insert nozzle and a wall of the chamber supporting the outlet port, and having a normal generator at the chamber bottom wall and following a base curve defined by the periphery of the outlet port that may be less than:
a total surface area of intermediate orifices located outside the flow-through cylinder. In other words, the deformation of the insert nozzle leads to a decrease in the height of the flow-through cylinder, and its restriction is effective on the flow of gases since the intermediate orifices (located outside the flow-through cylinder) have an area greater than that of the flow-through cylinder. In other words, along the path of the gases from the chamber to the outlet port, the flow-through cylinder (arranged downstream from the intermediate orifices located outside the flow-through cylinder) forms the orifice of smaller cross-section, and is therefore the one that controls the discharge rate. The variation in height of the flow-through cylinder caused by the deformation of the insert nozzle directly influences the discharge rate.

According to one embodiment, the intermediate orifices located outside the flow-through cylinder may be distributed regularly around the outlet port.

According to one embodiment, the offset portion may be separated from the chamber bottom wall by a distance of at least 0.4 mm.

According to one embodiment, the insert nozzle may comprise at least one deformable part, such as a flexible tab, resting against the chamber. The flexible tab, supported on the chamber, facilitates easy and robust assembly, as the insert nozzle can be press-fitted in the chamber. A buttress may be provided between the flexible tab and the chamber, to guarantee support on the chamber bottom and prevent any displacement that may shift the insert nozzle.

According to one embodiment, the insert nozzle may comprise a plurality of protuberances, such as tabs, with at least one tab arranged at a distance from the chamber. According to one embodiment, the insert nozzle may be a part formed by stamping, and in this case, this plurality of protuberances, such as tabs arranged at a distance from the insert chamber make it possible to manipulate the part and/or easily manufacture the part by punching-stamping.

According to one embodiment, the insert nozzle may have a thickness of at least 1.2 mm.

According to one embodiment, the insert nozzle may have a peripheral part curved towards a direction opposite to the outlet port, and a central part curved towards a direction opposite to the outlet port. Schematically, the insert nozzle may have a W cross-section with a central part having large dimensions.

According to one embodiment, the insert nozzle may be formed of a single piece.

According to one embodiment, the insert nozzle may be press-fitted in the chamber.

According to one embodiment, the insert nozzle may comprise at least one protuberance forming a buttress over the chamber.

According to one embodiment, the gas generator may comprise an abutment portion, formed for example by the chamber, and at least one part of the offset portion of the insert nozzle may be arranged to mechanically stop against the abutment portion if the pressure difference between the downstream face and the upstream face of the insert nozzle exerted by said at least some of the pressurized gas(es) exceeds a second predetermined threshold. Such an abutment makes it possible to guarantee the maximum deformation of the insert nozzle.

According to one embodiment, the insert nozzle may be directly opposite the breakable sealing means closing the outlet port before rupture. In other words, only the breakable sealing means are between the insert nozzle and the outlet port.

According to one embodiment, the chamber bottom may have a uniform and/or constant thickness. Provision may typically be made to manufacture the part from a sheet metal blank, with the chamber bottom in the form of a cup and/or with a U-shaped cross-section. the outlet port being arranged or bottom of the cross-section or U.

According to one embodiment, the insert nozzle may have a uniform and/or constant thickness. Provision can typically be made to manufacture the part from a sheet metal blank, and to punch the intermediate orifices, then perform shaping with an offset portion of the chamber bottom.

According to one embodiment, the gas generator may comprise:
a first chamber having the first pressurized gas(es) and a first outlet port closed by first breakable sealing means,
a second chamber with second pressurized gas(es) and a second outlet port closed by second breakable sealing means,
a diffusion zone, arranged to receive and diffuse towards an airbag the first pressurized gas(es) and the second pressurized gas(es) when the first breakable sealing means and the second breakable sealing means are broken.

According to one embodiment, the gas generator may comprise:
a first insert nozzle housed in the first chamber,
a second insert nozzle housed in a second chamber.

According to one embodiment, the first pressurized gas(es) and the second pressurized gas(es) may be arranged to react together once they are mixed.

According to one embodiment, the first breakable sealing means and/or the second breakable sealing means may comprise a cover, preferably a supported cover.

According to one embodiment, the gas generator may comprise at least one pyrotechnic igniter, arranged between the first chamber and the second chamber. Two pyrotechnic igniters may be provided, arranged between the first chamber and the second chamber. Said at least one pyrotechnic igniter may open into the diffusion zone.

According to one embodiment, the gas generator may comprise a diffuser delimiting the diffusion zone, arranged between the first chamber and the second chamber. The diffuser may typically be a metal wall comprising diffusion holes. The gas diffuser may comprise diffusion holes over at least 200°, at least 230°, at least 260° about an axial direction of the gas generator.

DESCRIPTION OF THE FIGURES

Other features and advantages of the present invention will become more apparent upon reading the following detailed description of an embodiment of the invention, which is provided by way of example but in no manner limited thereto, and illustrated by the attached drawings, in which:

FIG. 1 represents a perspective view of a gas generator according to the invention, comprising two chambers separated by a central diffusion zone also supporting two ignition sub-assemblies;

FIG. 2 represents a cross-section of the gas generator of FIG. 1 to show, in particular, the diffusion zone and each chamber equipped with an insert nozzle;

FIG. 3 represents a perspective view of an insert nozzle;

FIG. 4 represents a perspective view of an insert nozzle installed in one of the chambers of the gas generator of FIG. 1;

FIG. 5 represents a top view of FIG. 4 showing the insert pipe installed in one of the gas generator chambers of FIG. 1;

FIG. 6 represents a pressure curve example measured during the operation of the gas generator of FIG. 1 in a closed chamber, with test temperatures of −35° C., +22.5° C. and +85° C.

DETAILED DESCRIPTION OF EMBODIMENT(S)

FIG. 1 represents an elongated gas generator, generally comprising a first chamber 10, a second chamber 20 and a diffuser 30 arranged between the first chamber and the second chamber 20.

The diffuser 30 comprises diffusion holes 31, and supports two ignition sub-assemblies 41 and 42 forming activation means 40 of the gas generator.

The gas generator of FIG. 1 therefore has a general elongated form with an axial direction Ax, and the two ignition sub-assemblies 41 and 42 are oriented perpendicularly to the axial direction Ax. Furthermore, the diffuser 30 has diffusion holes 31 distributed over more than 250° with respect to the axial direction Ax.

FIG. 2 represents a cross-sectional view of the gas generator of FIG. 1 to show, in particular, the internal structure:

the first chamber 10 contains first pressurized gases, herein for example hydrogen (with for example between 30% and 50% hydrogen, the remainder being argon and helium for example, but a single gas may be provided, such as helium only for example), the second chamber 20 contains second pressurized gases, herein for example oxygen (with for example between 15% and 25% oxygen, the remainder being argon and helium for example, but a single gas may be provided, such as helium only for example), the diffuser 30 comprises a support and opening mechanism, intended to be controlled by the ignition sub-assemblies 41 and 42.

In more detail, the first chamber 10 is formed by a first chamber bottom 12 and a first cap 13 having a filling orifice closed by a first pin 18, the first chamber 10 comprises a first outlet port 16 (visible on FIG. 4) formed by a first visible tongue 15 (FIGS. 2 and 4) and closed by a first cover 14. It can be noted that the first tongue 15 has an elongated U or horseshoe shape and is attached to the first chamber bottom 12 by an attachment portion that forms a type of hinge: the first tongue 15 can be deformed and tilted or folded around the attachment portion.

The second chamber 20 is formed in turn by a second chamber bottom 22 and a second cap 23 having a filling orifice closed by a second pin 28, the second chamber 20 comprises a second outlet port 26 formed by a second tongue 25 and sealed by a second cover 24. It can be noted that the second tongue 25 has an elongated U or horseshoe shape and is attached to the second chamber bottom 22 by an attachment portion which forms a type of hinge: the second tongue 25 can be deformed and tilted or folded around the attachment portion.

As regards the diffuser 30, this latter supports the ignition sub-assemblies 41 and 42 and encloses a support and opening mechanism, comprising notably a slider 51 which supports (in the position represented in FIG. 2) the first tongue 15 and the second tongue 25. Thus, the first cover 14 and the second cover 24 are well supported respectively by the first tongue 15 and the second tongue 25, blocked by the slider 51. If the gas generator needs to be activated, the ignition sub-assembly 41 is ignited, which pushes the slider 51 downwardly, so that the first tongue 15 and the second tongue 25 are no longer blocked by the slider 51 and can tilt inwardly of the diffuser 30 (under the effect of the pressure of the gas 11 and 21 stored in the chambers 10 and 20), which causes the first cover 14 and the second cover 24 to rupture. The first pressurized gases 11 and the second pressurized gases 21 may be discharged towards the diffusion zone defined in the diffuser 30 and escape from the diffuser 30 to head into an airbag. The ignition sub-assembly 42 may be used to displace the internal elements of the diffuser in order to modify a total passage surface, in order to obtain a modified discharge, based for example on an impact force to be cushioned.

As seen hereinbefore, the first pressurized gases 11 and the second pressurized gases 21 can react together and during the operating sequence, it is possible to note the points below:

during storage, the first pressurized gases 11 and the second pressurized gases 21 are each in their respective chamber, during activation, the first tongue 15 and the second tongue 25 tilt and force the rupture of the first cover 14 and of the second cover 24, from that moment on, the first pressurized gases 11 and the second pressurized gases 21 can be discharged towards the diffusion zone, then, the first pressurized gases 11 and the second pressurized gases 21 escape from the diffuser 30 and force the airbag to start to unfold, the airbag is deployed and is gradually pressurized, the first pressurized gases 11 and the second pressurized gases 21 can react together throughout operation, as soon as they are mixed, i.e. in the diffusion zone (in the diffuser 30) and/or in the airbag.

It is also possible to note that just after the rupture of the first cover 14 and of the second cover 24, the airbag is forced to start unfolding and, in turn, pushes the protective housing that must also open: the forces exerted on the airbag and on the housing are sizable and must be managed to prevent excessively violent ruptures or deployment. It must be borne in mind that the first pressurized gases 11 and the second pressurized gases 21 may react together, which increases the forces exerted on the parts in question.

Furthermore, it can be noted that the operating temperature significantly influences the storage pressure of the pressurized gases. In fact, the gas generator may be required to operate at temperatures between −35° C. and +85° C., the pressure may then vary from 27 MPa to 46 MPa for example (for similar initial filling pressures), and the discharge flow rate is directly related to the pressure in the chamber concerned.

Consequently, provisions have been made to install a flow rate regulation device based on the pressure of the first pressurized gases 11 and on the second pressurized gases 21. To this end, an insert nozzle 60 is installed in each of the first chamber 10 and of the second chamber 20.

Each insert nozzle 60 is a part formed of a single piece as shown in FIG. 3. Provision may notably be made for a piece made from stamped sheet metal with, around the periphery, tabs which are optionally flexible 65 and with protuberances 66. The insert nozzle 60 comprises intermediate orifices 61 and 62, with a central orifice 61 and four peripheral orifices 62. Provision can be made for any other quantity or arrangement configuration for the intermediate orifices 61 and 62. In any event, provision can be made in a preferred manner for a plurality of intermediate orifices 62 around the periphery (not opposite the outlet port 16). However, it is possible to provide intermediate orifices of any shape (non-circular) and placed at any position on the insert nozzle 60. Finally, the insert nozzle 60 comprises a central offset portion 63 and staggered in height (along axis Ax) of a support portion 64 that surrounds the central portion 63.

The insert nozzle 60 may be formed in a piece of steel with a thickness of at least 1.2 mm, and preferably 1.3 mm or 1.5 mm. Provision can be made for a low carbon grade (0.1% carbon by weight maximum) called HC420LA—N°1.0556 according to standard EN 10268. For example, provision may be made for a breaking strength $R_m$ between 470 MPa and 590 MPa, and/or an elastic limit $R_{p0.2}$ between 420 MPa and 520 MPa, and/or an elongation before rupture A % of 17%.

The insert nozzle 60 is typically press-fitted in the first chamber 10 or the second chamber 20, and the flexible tabs 65 are arranged to deform and come into contact with the wall of the first chamber 10 or of the second chamber 20 as shown in FIGS. 2 and 4. Provision can be made for example for a buttressing of the flexible tabs 65 against the wall of the first chamber 10 or of the second chamber 20 to prevent any decline after assembly and thus to guarantee in a simple and economical manner a prolonged position and presence over time of the insert nozzle 60 in the chamber or chambers 10, 20.

The protuberances 66 are provided to produce the insert nozzle 60, by forming attachment portions with the sheet metal blank that are broken once the entire insert nozzle 60 is formed, with in particular the flexible tabs 65 folded and respecting a precise diameter to facilitate press-fitting. FIG. 5 shows the insert nozzle 60 fitted in the chamber bottom 12, with the flexible tabs 65 in good contact with the chamber bottom 12, whereas the protuberances 66 are separated from the wall of the chamber bottom 12.

As explained hereinbefore, the insert nozzle 60 is cup-shaped with the offset portion 63 elevated with respect to the support portion 64, as shown in FIG. 4. In fact, the insert nozzle 60 has a cross-section in a simplified W-shape with the central offset portion 63 separate from the chamber bottom 12, and with the support portion 64 in contact with the chamber bottom 12. In the example shown, the central offset portion 63 is separate from the chamber bottom 12 by a gap J that may be for example 0.5 mm. It is also possible to provide that the insert nozzle 60 rests on the first cover 14 (which would then have a larger diameter than that shown in FIG. 4).

This provision facilitates the following functions:
- the support portion 64 in contact with the chamber bottom 12 prevents the first pressurized gases 11 to pass between the support portion 64 of the insert nozzle 60 and the chamber bottom 12 (in particular, it is possible to provide a flat surface of a few millimeters over the support portion 64 to create a longer gas passage between the insert nozzle 60 and the chamber bottom 12),
- the central intermediate orifice 61 is opposite the first tongue 15 and the first cover 14, shown in FIG. 4 in the sealing position: once the first cover 14 is broken and the first tongue 15 is tilted or has collapsed, the central intermediate orifice 61 is directly opposite the outlet port 16,
- the peripheral intermediate orifices 62 are opposite a solid portion of the chamber bottom 12: the gases that pass through these peripheral intermediate orifices 62 must pass via the lateral surface of a cylinder having a base circle (Cb, FIG. 5) tangential to the parts of the peripheral intermediate orifices 62 located on the side of the outlet port 16, and in height the gap J that separates the central offset portion 63 from the chamber bottom 12. The area of the flow-through cylinder (the product of the gap J times the perimeter of the base circle tangent Cb) is chosen to be less than the sum of the areas of the peripheral intermediate orifices 62, so that any variation in the gap J (caused by a deformation of the insert nozzle 60) has a direct effect on the flow rate of gas that may go from the intermediate orifices 62 to the outlet port 16.

During operation, and immediately after the rupture of the first cover 14 and the tilting of the first tongue 15, there is no or little pressure on the downstream face (outlet port side 16) of the insert nozzle 60 as the diffusion zone is not pressurized, whereas the upstream face (chamber side) is subject to the storage pressure of the first pressurized gases 11. This pressure difference instantly causes the insert nozzle 60 to deform with the displacement of the offset portion 63 towards the outlet port 16. Consequently, the passage of gas towards the outlet port 16 via the peripheral intermediate orifices 62 is restricted.

If, for example, the storage pressure is between 34 MPa and 40 MPa at +22.5° C., it is possible to have between 24 MPa and 31 MPa at −35° C. and between 43 MPa and 52 MPa at +85° C. Consequently, the restriction of the passage of gas towards the outlet port 16 via the peripheral intermediate orifices 62 varies based on the temperature as the deformation of the insert nozzle 60 is, on the whole, proportional to the pressure applied.

It is also possible to provide for plastic deformation, for example, as soon as the operating temperature exceeds −10° C. or 0° C., i.e., if the pressure difference between the downstream face of the insert nozzle 60 and the upstream face exceeds a first pressure threshold, for example 30 MPa.

Thus, at low temperatures, the passage of gas is slightly restricted, and it is severely restricted at high temperatures. Such an implementation makes it possible to limit the performance differences, and in particular, this limits the rate of pressure increase between the operating temperatures. Indeed, once the insert nozzle is irreversibly deformed, it continues to impose a restricted passage during discharge, even when the upstream pressure in the chamber decreases. Overall, once the insert nozzle is practically deformed, the passage area of the gases during operation remains restricted until the complete discharge.

Provision can also be made for the insert nozzle 60 to abut the chamber bottom 12 as soon as the operating temperature exceeds +60° C., i.e., if the pressure difference between the downstream face of the insert nozzle 60 and the upstream face exceeds a second pressure threshold, for example 45 MPa. Such an implementation makes it possible to limit the maximum deformation of the insert nozzle 60, to secure the operation of the gas generator.

FIG. 6 shows pressure measurement curves as a function of time performed during tests in a closed enclosure on gas generators of FIG. 1, at respective temperatures of −35° C., +22.5° C. and +85° C. It can be noted that the pressure curves almost overlap at the start of operation (between 0 ms and 40 ms), and that at the end of operation (after 80 ms), the pressure difference is minimal (approximately 5% between each temperature, whereas with gas generators of the prior art without an insert nozzle, differences of approximately 10% or even 15% between each temperature can be expected). These tests demonstrate reduced variability over the temperature range, with the result that the airbag is pressurized in a more repeatable manner during tests performed at −35° C., +22.5° C. and +85° C.

It will be understood that various modifications and/or improvements which are obvious to a person skilled in the art may be made to the different embodiments of the invention described in the present description without departing from the scope of the invention.

In particular, it can be noted that the use of an insert nozzle is not limited to gas generators with two pressurized enclosures, nor to gas generators with reactive gases. Use can indeed be made of such an insert nozzle in a hybrid gas generator (with, for example, a single gas reserve, and a fuel or solid propellant), or a cold gas generator (a single gas reserve, with a simple opening device).

INDUSTRIAL APPLICATION

A gas generator according to the present invention, and its manufacture, are capable of industrial application.

The invention claimed is:

1. A gas generator comprising:
a chamber having a chamber bottom wall with an outlet port,
breakable seal closing the outlet port,
pressurized gas stored in the chamber, and
an insert nozzle positioned in the chamber, the insert nozzle including at least three intermediate orifices and positioned between the outlet port and at least some of the pressurized gas,
wherein the insert nozzle is arranged so as to deform after the breakable seal is ruptured, during application of a pressure difference between a downstream face and an upstream face of the insert nozzle exerted by the at least some of the pressurized gas, so as to restrict a passage of gas towards the outlet port, the insert nozzle operable in a first mode and a second mode such that in the first mode the insert nozzle reversibly deforms when a pressure difference between the downstream face and the upstream face of the insert nozzle is below a predetermined threshold and in the second mode the insert nozzle irreversibly deforms when the pressure difference between the downstream face and the upstream face of the insert nozzle exceeds the predetermined threshold, wherein the insert nozzle is arranged opposite the chamber bottom wall and comprises a peripheral support portion integrally formed with a central offset portion, the peripheral support portion being supported on the chamber bottom wall, and in the first mode the central offset portion being offset in an upstream direction from the peripheral support portion so as to be spaced from the chamber bottom wall by a gap and the central offset portion comprising at least one of the intermediate orifices.

2. The gas generator according to claim 1, wherein the restricted gas passage is arranged between at least one of the intermediate orifices and the outlet port.

3. The gas generator according to claim 1, wherein the peripheral support portion surrounds the outlet port.

4. The gas generator according to claim 1, wherein at least one of the intermediate orifices is arranged around a periphery of the central offset portion.

5. The gas generator according to claim 1, wherein the at least one of the intermediate orifices is opposite a solid portion of the chamber bottom wall.

6. The gas generator according to claim 1, wherein one of the intermediate orifices is arranged opposite the outlet port.

7. The gas generator according to claim 1, further comprising:
a lateral surface of a flow-through cylinder having a height defined by a distance between the downstream face of the insert nozzle and a wall of the chamber supporting the outlet port, and having a generatrix perpendicular to the chamber bottom wall and following a base curve defined by a periphery of the outlet port that is less than:
a total surface area of the intermediate orifices located outside the flow-through cylinder.

8. The gas generator according to claim 7, wherein the intermediate orifices located outside the flow-through cylinder are distributed regularly around the outlet port.

9. The gas generator according to claim 1, wherein the central offset portion is separated from the chamber bottom wall by a gap distance of at least 0.4 mm.

10. The gas generator according to claim 1, wherein the insert nozzle comprises at least a deformable part resting on the chamber.

11. The gas generator according to claim 1, wherein the insert nozzle comprises a plurality of protuberances with at least one of the protuberances arranged at a distance from the chamber.

12. The gas generator according to claim 1, wherein the insert nozzle has a thickness of at least 1.2 mm.

13. The gas generator according to claim 1, wherein the insert nozzle has a peripheral part curved towards a direction opposite to the outlet port, and a central part curved towards a direction opposite to the outlet port.

14. The gas generator according to claim 1, wherein the insert nozzle is operative to compensate for differences in discharge rates by regulating an area of a gas passage toward the outlet port.

15. The gas generator according to claim 14, wherein the insert nozzle compensates faster for differences in discharge rates at higher temperatures.

16. The gas generator according to claim 14, wherein the insert nozzle is operative to limit a rate of pressure increase between operating temperatures.

17. A gas generator comprising:
- a chamber having a chamber bottom wall with an outlet port,
- breakable seal closing the outlet port,
- pressurized gas stored in the chamber, and
- an insert nozzle positioned in the chamber, the insert nozzle including a peripheral support portion that is disposed against the chamber bottom wall and the peripheral support portion being integrally formed with a central offset portion offset in an upstream direction from the peripheral support portion, the central offset portion having at least three intermediate orifices and positioned between the outlet port and at least some of the pressurized gas,
- wherein the central offset portion of the insert nozzle is arranged so as to deform after the breakable seal is ruptured, during application of a pressure difference between a downstream face and an upstream face of the insert nozzle exerted by the at least some of the pressurized gas, so as to restrict a passage of gas towards the outlet port, and
- wherein the insert nozzle is operable to irreversibly deform when an operating temperature exceeds a predetermined operating temperature if the pressure difference between the downstream face and the upstream face of the insert nozzle exceeds a predetermined pressure threshold.

\* \* \* \* \*